(12) United States Patent
Dunn

(10) Patent No.: US 7,168,272 B2
(45) Date of Patent: Jan. 30, 2007

(54) CRIMP-FREE INFUSIBLE REINFORCEMENT FABRIC

(75) Inventor: Matthew W. Dunn, Lewisville, NC (US)

(73) Assignee: Owens Corning Fiberglas Technology, Inc., Summit, IL (US)

(*) Notice: Subject to any disclaimer, the term of this patent is extended or adjusted under 35 U.S.C. 154(b) by 132 days.

(21) Appl. No.: 10/674,987

(22) Filed: Sep. 30, 2003

(65) Prior Publication Data
US 2005/0070182 A1 Mar. 31, 2005

(51) Int. Cl.
*D04B 23/10* (2006.01)

(52) U.S. Cl. ...................................................... 66/202

(58) Field of Classification Search .............. 66/169 R, 66/170, 190, 193, 202
See application file for complete search history.

(56) References Cited

U.S. PATENT DOCUMENTS

| | | | |
|---|---|---|---|
| 4,066,106 A * | 1/1978 | Graham | 139/420 C |
| 4,407,885 A | 10/1983 | Murphy et al. | |
| 4,410,385 A | 10/1983 | Murphy et al. | |
| 4,460,633 A | 7/1984 | Kobayashi et al. | |
| 4,557,968 A * | 12/1985 | Thornton et al. | 442/198 |
| 4,571,355 A * | 2/1986 | Elrod | 428/102 |
| 4,615,934 A | 10/1986 | Ellison | |
| 4,911,973 A | 3/1990 | Dunbar | |
| 5,055,242 A | 10/1991 | Vane | |
| 5,085,928 A | 2/1992 | Krueger | |
| 5,147,714 A | 9/1992 | Ellison et al. | |
| 5,149,583 A | 9/1992 | Saarikettu | |
| 5,445,693 A | 8/1995 | Vane | |
| 5,484,642 A * | 1/1996 | Bompard et al. | 428/166 |
| 5,809,805 A | 9/1998 | Palmer et al. | |
| 6,599,610 B2 * | 7/2003 | Homma et al. | 428/102 |

FOREIGN PATENT DOCUMENTS

| | | |
|---|---|---|
| EP | 0 270 411 | 6/1988 |
| EP | 0 909 845 | 4/1999 |
| EP | 1 419 875 | 5/2004 |

* cited by examiner

*Primary Examiner*—Danny Worrell
(74) *Attorney, Agent, or Firm*—Inger H. Eckert; Margaret S. Millikin

(57) ABSTRACT

The present invention relates to a composite fabric wherein a plurality of small tows are intermittently spaced between large tows forming channels. The channels formed by spacing the between the large tows thereby forming ridges. The irregular thickness that results from the ridges provides flow channels during resin infusion of the fabric. The flow channels permit resin to flow evenly and quickly through the fabric, which results in shorter processing time and a more consistent resin distribution, decreasing the likelihood of resin starved areas within the cured laminate.

30 Claims, 3 Drawing Sheets

CRIMP-FREE INFUSIBLE REINFORCEMENT FABRIC

TECHNICAL FIELD

This invention relates to composite fabrics and to a method of making composite fabrics. More particularly, it relates to an improved composite fabric having smaller yarns spaced between larger yarns, which form channels in the fabric. When resin is applied to the fabric, during lamination, the channels permit faster resin distribution in the fabric.

BACKGROUND

Composite fabrics made from fibrous materials formed into both woven, knitted and non-woven material, are well-known in the art. Yarns of glass, carbon and graphite are typically formed into fabrics, and a plurality of layers of fabric are stacked and cut into dry fabric preforms. The preforms are then stitched and/or impregnated with a resin binder to form a rigid composite fabric.

Typically, a glass reinforced fibrous mat is preformed and then placed in a mold for molding into a fiber-reinforced article. Glass fiber-reinforcement mats are used in situations where a desired strength is necessary, such as in boat hulls or automobile parts. For example, layers of the continuous strand mat and layers of unidirectional or multidirectional reinforcement material are fabricated separately. These layers are individually placed in a set of preform screens, which generally consist of an upper screen and a lower screen. The upper and lower screens are moved together in order to conform the layers to the shape of the preform screens. The layers are thus shaped into what is known as a preform. The preform is then placed in a mold and injected with a suitable resinous material to make the fiber-reinforced article.

As shown in U.S. Pat. No. 4,911,973, to facilitate impregnation of the fabric with resin, holes are typically punched in the fabric as two or more layers of fabric are sewn together. The holes extend through the fabric and when the fabric is impregnated with resin, the resin material flows into the holes in the blanket. The holes in the fabric aid in distributing resin throughout the fabric.

The crimping of the yarns that occurs as the warp and weft yarns cross over and under each other reduces the tensile and, more significantly, the compressive strength of a woven fabric. In the past, fabrics have been designed utilizing yarns having varying denier (fiber diameter) to increase strength and reduce crimping of the fabric.

U.S. Pat. No. 4,615,934 teaches a fabric having warp yarns of heavy denier separated by eight warp yarns of lighter denier. The fabric is incorporated into a polymeric resin by lamination, heat bonding or coating the fabric with the resin. U.S. Pat. No. 5,147,714 (related to U.S. Pat. No. 4,615,934) utilizes this same concept of alternating heavier and lighter denier yarns however the fabric is laminated between two conductive sheets of PVC film.

U.S. Pat. No. 4,460,633 teaches a non-woven reinforcement constructed of high denier warps of non-twist yarns or soft twist yarns on both sides of lower denier wefts of non-twist yarns or soft twist yarns containing an adhesive agent, in which the warps and wefts are bonded where they intersect.

U.S. Pat. No. 4,407,885 and U.S. Pat. No. 4,410,385 (related) teach a composite non-woven fabric and a method of making the composite fabric in which the layers of the fabric are impregnated with a resin binder to form a rigid composite fabric. Thermoplastic fibrous material is incorporated within the structure of non-woven layers. A plurality of layers of fabric are stacked adjacent each other to provide a preform assembly. The layers are then compacted and heated to promote the bonding of the thermoplastic material at junctures between the fibrous non-woven material.

U.S. Pat. No. 5,085,928 teaches porous layers of unidirectional aramid fibers alternated with porous layers of spunlaced nonwoven aramid fibers all of which are embedded in a thermoplastic resin.

U.S. Pat. No. 5,809,805 teaches a warp/knit stich reinforced multi-axial non-crimp layered fabric sheet. The fabric is comprised of a plurality of plies, which have a different angular relationship to one another, disposed upon one another and knitted or stiched to form a structural sheet. The sheet is then impgrenated with a resin.

U.S. Pat. No. 5,445,693 and related U.S. Pat. No. 5,055,242 teach a formable composite material having a plurality of superimposed layers each having having a plurality of unidirectional non-woven yarns or threads laid side-by-side. Some of the yarns or thread extend of different layers extend in different directions. The layers are incorporated with a resin material prior to being stiched together.

U.S. Pat. No. 5,149,583 teaches a mat in which reinforcing threads are bound or laminated to form a strong shell structure. The knitting of the mat is performed with a double circular knitting machine to form a weft-knitted mat. The fabric contains a plurality of loops in which reinforcing threads run with the support of the loops and straight between the courses in a channel formed by the loops.

As taught above, it is known to have heavy denier warp yarns separated from each other by lighter denier warp yarns in a warp-inserted weft knit fabric. Also, using sewing needles to form a plurality of channels in a reinforcement blanket to aid in distributing resin throughout the blanket is known. Both methods permit resin to be distributed throughout the fabric.

There is a need to provide a fabric, having continuous fibers, to be used in a molding process, in which the design of the fabric increases the speed of resin infusion to reduce processing time in the mold.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

SUMMARY

The present invention relates to a composite fabric wherein a plurality of small tows are intermittently spaced between large tows forming channels. The irregular thickness that results from the ridges provides flow channels during resin infusion of the fabric. The flow channels permit resin to flow evenly and quickly through the fabric, which results in shorter processing time and a more consistent resin distribution, decreasing the likelihood of resin starved areas within the cured laminate.

It is an object of this invention to provide a crimp-free composite fabric.

It is an object of this invention to provide a composite fabric which is designed to decrease the processing time of resin infusion.

It is an object of this invention to provide a composite fabric that is usable with all types of resin systems.

It is an object of this invention to provide a composite fabric which can be constructed of various types of fibers

Figure 1:
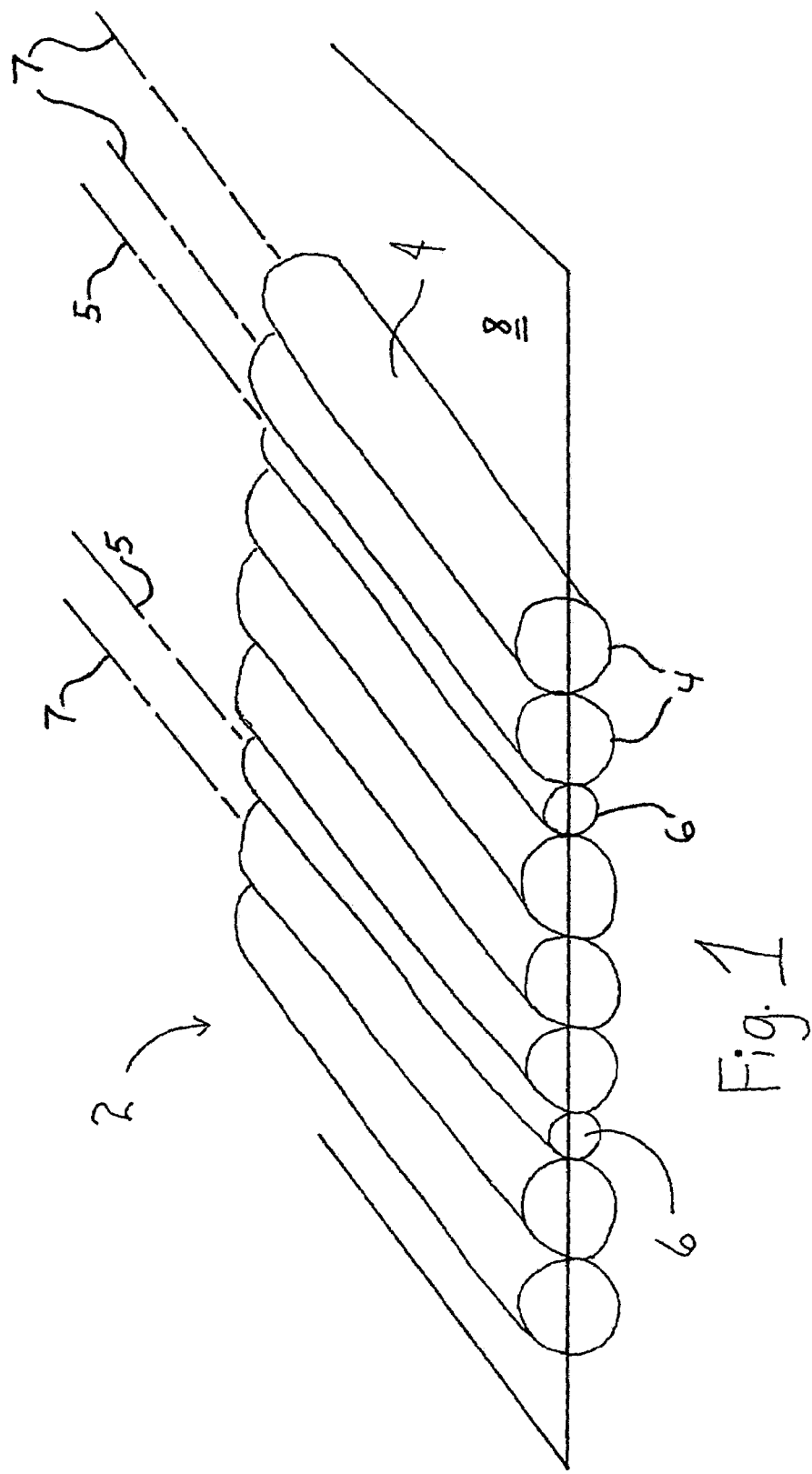
FIG. 1 is a fragmentary, perspective view of a preferred fabric configuration of the present invention.

In describing preferred embodiments of the invention, which are illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although preferred embodiments of the invention are herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF INVENTION

The above objects have been achieved through the development of a fabric 2 having parallel small tows 6 spaced between parallel large tows 4 to form channels where the axes of the large tows 4 and the small tows 6 are in a coplanar relationship. The large tows 4 have a yield (yards/pound) which is at least twice as large as the small tows 6. The channels can be formed in a single ply in a fabric or in any number of plies in a multi-ply fabric. When the fabric is infused with resin, the channels permit faster resin infusion of the fabric.

Referring to FIG. 1, a fragmentary, perspective view of the fabric of the present invention is shown. Fabric 2 is made of a plurality of intermittently spaced, small tows 6 spaced between large tows 4. The large tows 4 have a greater yield (yards/pound) than the small tows 6. Preferably, the large tows have a yield of between about 52 to about 450 yield, more preferably of between about 150 to about 350 yield and most preferably between about 150 to about 220 yield. Preferably the small tows have a yield of between about 1200 to about 2500 yield, ore preferably between about 1200 to about 2000 yield and most preferably between about 1500 to about 1800 yield. The small tows 6 have longitudinal axes 5, and the large tows 4 have longitudinal axes 7. As shown in FIG. 1, the longitudinal axes 5 and longitudinal axes 7 are co-planar, lying in plane 8.

Figure 2:
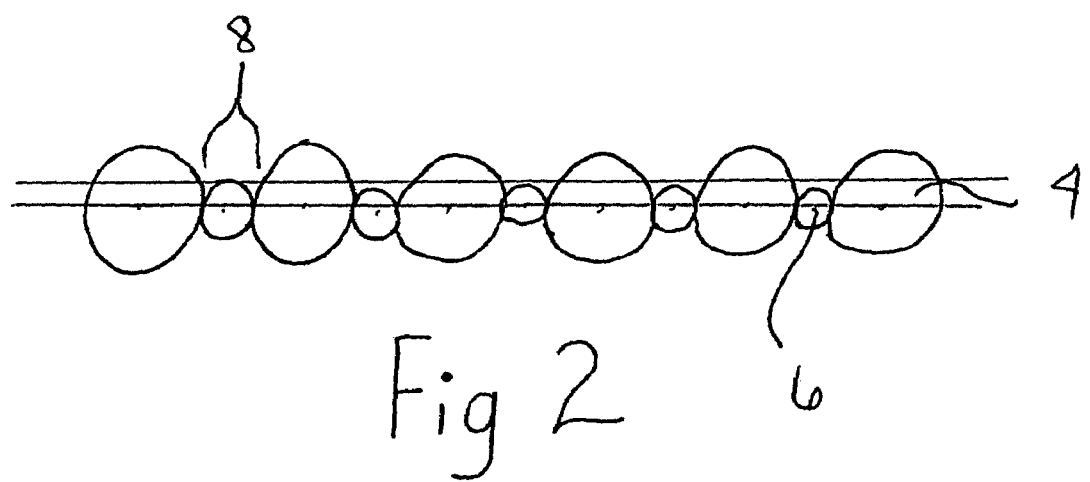
FIG. 2 is a cross-sectional view of a preferred fabric configuration of the present invention.

The spacing of the small tows may vary, i.e., one small tow spaced between two or three large tows, or equally alternating small and large tows (see FIG. 2). Spacing of the tows may be determined by the resin, i.e., a more viscous resin would require equally alternating small and large tows, thus creating more channels for the flow of the resin. In the alternative, a less viscous resin would require varying spacing of small and large tows, i.e., less small tows spaced between the large tows.

The present invention is compatible with various different glass fiber-reinforcements. Any suitable unidirectional or multidirectional reinforcement materials can be employed. It is within the contemplated scope of this invention that such unidirectional or multidirectional reinforcement material include, but not be limited to, such materials as, for example, chopped strand mat, knitted rovings or woven rovings, aramid reinforcements or carbon reinforcements. Unidirectional knitted rovings are normally comprised of E-glass rovings, (such as rovings of 300 yield (300 yards/pound)), for example, rovings known as T30 from the Owens-Corning Fiberglas Corporation). Bidirectional knitted roving material is constructed by a precision knitting process. The fiberglass strands are typically treated with a binder or sizing (such as Owens Corning 111A, PPG 2022, etc.), a wetting agent, emulsifying agent and water. These sizes or binders are intended to protect the fibers from damage during their formation and subsequent operations of twisting, plying and weaving.

The fabric of the present invention may be constructed of woven, knitted or non-woven fibers, yarns, threads, filaments and the like. The structural fibrous materials may be any well-known materials which form fibers, filaments, threads, yarns, woven fabrics, knitted fabrics, non-woven fabrics, batts, felts, and the like. As used herein, the term, structural fibrous material, embraces all of the various types of materials, which form such fabrics useful to form a composite fabric in accordance with the present invention. Exemplary structural fibrous materials include glass in the form of glass fibers, carbon or graphite in the form of carbon or graphite fibers, non-graphite carbon fibers, vitreous carbon fibers, boron monolithic graphite and monolithic non-graphite carbon fibers, silicon, aramid and other refractory materials. In addition, thermoplastic fibrous material may also be used. The fabric may also be a hybrid fabric, having more than one type of structural fiber in its construction, i.e., glass/thermoplastic, aramid/glass, and other combinations such as combination of the materials listed above.

FIGS. 1–2 depict a unidirectional fiber orientation of the fabric 2. There are various methods of maintaining the primary fibers in position in a unidirectional fabric including weaving, stitching, and bonding, as is known in the art. In a preferred embodiment, the fibers are crimp-free warp knitted fabrics otherwise know as stitch-bonded fabrics.

The tows are held in place by a secondary, non-structural stitching tread, typically a polyester thread or any other thread conventionally used in the art. Regardless of the structure, the fabric 2 of the present invention is a corrugated fabric, which is essentially crimp-free as a result of spacing small tows 6 between large tow 4. Preferably, the fabric 2 of the present invention is stitch-bonded using conventional stitch-bonding techniques and styles, i.e., chain, tricot, modified tricot, promat). Conventional machines known in the art such as a Liba stitch-bonding machine are used to make the fabric of the present invention.

Figure 3:
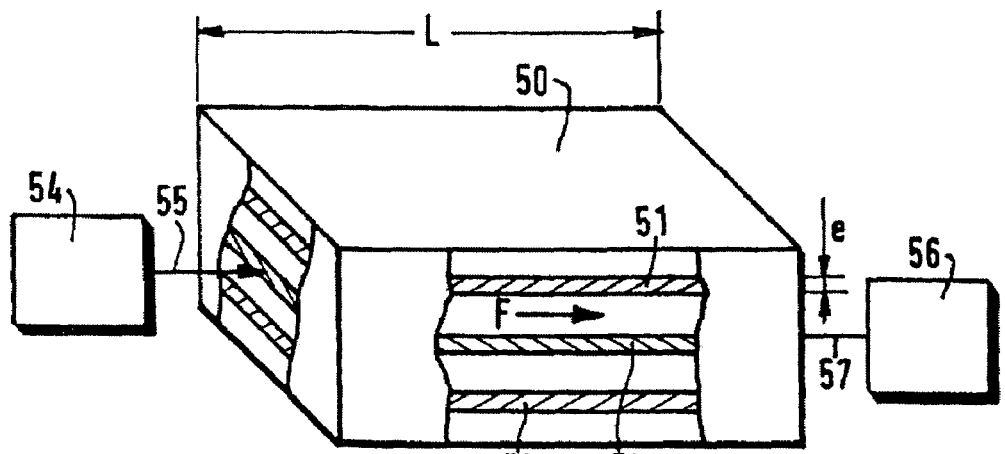
FIG. 3 is a partially sectional perspective view showing a biaxial fabric of the present invention.
Figure 4:
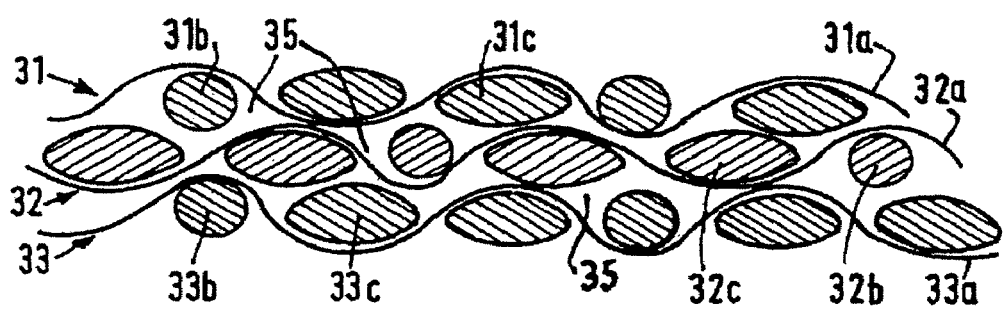
FIG. 4 is a partially sectional perspective view showing a triaxial fabric of the present invention.
Figure 5:
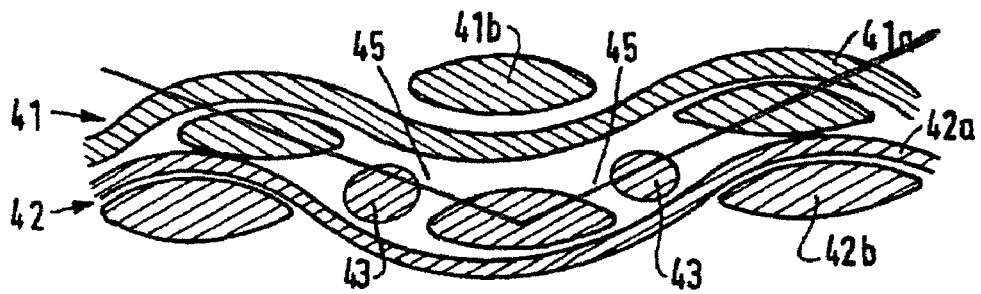
FIG. 5 is a partially sectional perspective view showing a quadaxial fabric of the present invention.

The structure of the fabric of the present invention may also be bi-axial, tri-axial, quadaxial or multiaxial fabric structures, consisting of one or more layers of the large tows 4 and small tows 6 of fabric 2 which are coaxially aligned as shown in FIGS. 3–5. FIG. 3 shows a biaxial fabric 10 having layers 12 and 14. Layer 12 has small tows 18 adjacent large tows 16. FIG. 4 illustrates a triaxial fabric 24 has layers 26, 28 and 30. Layer 26 has small tows 32 adjacent large tows 34. Layer 28 has small tows 38 adjacent large tows 36. Layer 30 has small tows 40 adjacent large tows 42. FIG. 5 shows quadaxial fabric 44 having layers 46, 48, 50 and 52. Layer 46 has small tows 54 adjacent large tows 56 Layer 48 has small tows 60 adjacent large tows 58. Layer 50 has small tows 62 adjacent large tows 64. Layer 52 has small tow tows 68 adjacent large tows 66.

As mentioned, the fabric 2 is particularly useful in molding processes where resin must move through a fabric to create a consolidated composite. One particular process is resin transfer molding (RTM). Resin transfer molding (RTM) is a process by which a resin is pumped at low viscosities and low pressures into a closed mold die set containing a preform of dry fabric, i.e., fabric 2, to infuse resin into the preform and to make a fiber-reinforced composite part. The RTM process can be used to produce at low cost composite parts that are complex in shape. These parts typically require continuous fiber reinforcement along with inside mold line and outside mold line controlled surfaces. The ability to include and place continuous fiber reinforcement in large and small structures sets RTM apart from other liquid molding processes. Fabric 2 is also useful in a vacuum assisted resin transfer molding (VARTM) system. In VARTM, the preform is covered by a flexible sheet or liner, such as fabric 2. The flexible sheet or liner is clamped onto the mold to seal the preform in an envelope. A catalyzed matrix resin is then introduced into the envelope to wet the preform. A vacuum is applied to the interior of the envelope via a vacuum line to collapse the flexible sheet against the preform. The vacuum draws the resin through the preform and helps to avoid the formation of air bubbles or voids in the finished article. The matrix resin cures while being subjected to the vacuum. The application of the vacuum draws off any fumes produced during the curing process. The fabric 2 of the present invention is useful in standard vacuum infusion molding processes as well as process where the reinforced fabric is under vacuum.

Suitable thermoplastic resins useful with the present invention in the above molding processes include polyesters (including copolyesters), e.g., polyethylene terephthalate, polyamides, polyolefins, and polypropylene.

Thermosetting resins that are useful include phenolic resins, epoxy resins, vinyl ester resins, and thermosetting polyester resins.

It is possible that changes in configurations to other than those shown could be used but that which is shown is preferred and typical. It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

The invention claimed is:

1. A fabric comprising:
   a) a plurality of substantially parallel first tows;
   b) a plurality of second tows substantially parallel to said first tows, wherein said first and second tows are arranged in a single layer and each of said second tows is juxtaposed to at least two of said first tows thereby defining a channel, and wherein said second tows have a greater yield than the yield of said first tows, and wherein axes of the first tows and the second tows are in a coplanar relationship.

2. The fabric of claim 1 wherein said first tows and said second tows are stitched together.

3. The fabric of claim 1, wherein said fabric is a crimp-free fabric.

4. The fabric of claim 1, wherein said yield of said first tows is between about 52 to about 450 yards/pound.

5. The fabric of claim 4, wherein said yield of said first tows is between about 52 to about 350 yards/pound.

6. The fabric of claim 5, wherein said yield of said first tows is between about 150 to about 220 yards/pound.

7. The fabric of claim 1, wherein said yield of said second tows is between about 1200 to about 2500 yards/pound.

8. The fabric of claim 7, wherein said yield of said second tows is between about 1200 to about 2000 yards/pound.

9. The fabric of claim 7, wherein said yield of said second tows is between about 1500 to about 1800 yards/pound.

10. The fabric of claim 1, wherein said first tows and said second tows are coaxially aligned.

11. The fabric of claim 1, wherein said fabric is a unidirectional fabric.

12. The fabric of claim 1, wherein said fabric is a biaxial fabric.

13. The fabric of claim 1, wherein said fabric is a triaxial fabric.

14. The fabric of claim 1, wherein said fabric is a quadaxial fabric.

15. A method of making a fabric comprising the steps of:
   a) providing a plurality of substantially parallel first tows;
   b) providing a plurality of substantially parallel second tows; wherein said second tows have a greater yield than the yield of said first tows; and
   c) spacing at least two of said first tows juxtaposed to at least one of said second tows in a single layer thereby forming a channel, and wherein axes of the first tows and the second tows are in a coplanar relationship.

16. The method of claim 15, wherein said plurality of first tows and said plurality of second tows are stitched together.

17. The method of claim 15, wherein said fabric is a crimp-free fabric.

18. The method of claim 15, wherein said yield of said first tows is between about 150 to about 500 yards/pound.

19. The method of claim 18, wherein said yield of said first tows is between about 150 to about 250 yards/pound.

20. The method of claim 19, wherein said yield of said first tows is between about 190 to about 220 yards/pound.

21. The method of claim 15, wherein said yield of said second tows is between about 1200 to about 3000 yards/pound.

22. The method of claim 21, wherein said yield of said second tows is between about 1200 to about 2500 yards/pound.

23. The method of claim 22, wherein said yield of said second tows is between about 1500 to about 2000 yards/pound.

24. The method of claim 15, wherein said first tows and said second tows are coaxially aligned.

25. The method of claim 15, wherein said fabric is a unidirectional fabric.

26. The method of claim 15, wherein said fabric is a biaxial fabric.

27. The method of claim 15, wherein said fabric is a triaxial fabric.

28. The method of claim 15, wherein said fabric is a quadaxial fabric.

29. The fabric of claim 1, wherein said first tows are intermittently spaced between said second tows.

30. The method of claim 15, wherein said first tows are intermittently spaced between said second tows.

* * * * *